(12) United States Patent
Denson et al.

(10) Patent No.: US 10,940,858 B2
(45) Date of Patent: Mar. 9, 2021

(54) MULTI-MODE COLLISION AVOIDANCE SYSTEM

(71) Applicant: Esperanto Sensors LLC, Marietta, GA (US)

(72) Inventors: Miles Shugerman Denson, Marietta, GA (US); Jared Adam Denson, Atlanta, GA (US); Michael Craig Schexnayder, Huntsville, GA (US); Richard T. Garcia, Cypress, TX (US)

(73) Assignee: Esperanto Sensors LLC, Marietta, GA (US)

( * ) Notice: Subject to any disclaimer, the term of this patent is extended or adjusted under 35 U.S.C. 154(b) by 0 days.

(21) Appl. No.: 15/826,308

(22) Filed: Nov. 29, 2017

(65) Prior Publication Data

US 2018/0186370 A1    Jul. 5, 2018

Related U.S. Application Data

(60) Provisional application No. 62/427,407, filed on Nov. 29, 2016.

(51) Int. Cl.
*B60W 30/095*    (2012.01)
*G08G 1/16*    (2006.01)

(52) U.S. Cl.
CPC .... *B60W 30/0956* (2013.01); *B60W 30/0953* (2013.01); *G08G 1/161* (2013.01);
(Continued)

(58) Field of Classification Search
CPC ............................................... B60W 30/0956
See application file for complete search history.

(56) References Cited

U.S. PATENT DOCUMENTS

| 4,143,370 A | * | 3/1979 | Yamanaka | ............ G01S 13/931 |
| | | | | 342/107 |
| 5,453,740 A | * | 9/1995 | Gallagher | .............. B60Q 9/008 |
| | | | | 340/436 |

(Continued)

*Primary Examiner* — Michael A Berns
(74) *Attorney, Agent, or Firm* — Charlena Thorpe, Esq.; Incorporating Innovation LLC (57) ABSTRACT

Implementations a method using a collision detection device associated with a user to detect a moving object in an environment and provide an alert to the user are provided. In some implementations the environment comprises at least one transmitter of opportunity. In some implementations, the collision detection device comprises a receiver and a processor. In some implementations, the method comprises receiving at the collision detection device Wi-Fi signals reflected from the moving object where the Wi-Fi signals originate from a Wi-Fi source not associated with the moving object. The method further comprises detecting, measuring, and tracking the Doppler effect of the Wi-Fi signals at the collision detection device to track velocity vector relative to the collision detection device. The method further comprises calculating the time of arrival of the moving object based on the velocity vector relative to the location of the collision detection device. The method further comprises tracking the relative angle between the moving object and the collision detection device based on the velocity vector. The method further comprises predicting the occurrence of a collision between the moving object and the collision detection device based on the relative angle. The method further comprises providing a notification based on the predicting step.

9 Claims, 5 Drawing Sheets

(52) U.S. Cl.
CPC ......... *G08G 1/166* (2013.01); *B60W 2400/00* (2013.01); *B60W 2420/60* (2013.01); *B60W 2556/45* (2020.02)

(56) References Cited

U.S. PATENT DOCUMENTS

| | | | |
|---|---|---|---|
| 8,902,102 B2 * | 12/2014 | Goodson | G01S 13/003 342/29 |
| 9,230,419 B2 * | 1/2016 | Beggs | B60Q 1/2673 |
| 9,542,824 B2 * | 1/2017 | Beggs | B60Q 1/2673 |
| 9,707,961 B1 * | 7/2017 | Halder | B60W 40/04 |
| 9,875,635 B2 * | 1/2018 | Sawada | G01V 15/00 |

* cited by examiner

MULTI-MODE COLLISION AVOIDANCE SYSTEM

CROSS REFERENCE TO RELATED APPLICATION

This application claims the benefit of U.S. Patent Application Ser. No. 62/427,407, which was filed on Nov. 29, 2016, and is incorporated herein by reference in its entirety.

TECHNICAL FIELD

This disclosure relates to implementations of a multi-mode collision avoidance system ("MMCAS").

BACKGROUND

Collisions between motor vehicles (e.g., cars or trucks) and cyclists (e.g., bicyclists or motorcyclists) or pedestrians is a serious problem. For example, in the United States alone in 2014, there were 50,000 bicyclists injured with 726 fatalities and 65,000 pedestrians injured with 4,901 fatalities in motor vehicle collisions. There is no product, solution, or technology on the market today that can effectively notify bicyclists, pedestrians, and/or motor vehicle drivers of a potential collision with a sufficient warning distance and lead-time to avoid the collision.

DETAILED DESCRIPTION

Implementations of a multi-mode collision avoidance system ("MMCAS") is provided. In some implementations, the MMCAS is configured to identify moving objects relative to the MMCAS. In some implementations, the MMCAS is configured to convey information regarding the moving object(s) to the user of the MMCAS via any suitable auditory, visual, or haptic interface.

Implementations of a method using a collision detection device associated with a user to detect a moving object in an environment and provide an alert to the user are further provided. In some implementations the environment comprises at least one transmitter of opportunity. In some implementations, the collision detection device comprises a receiver and a processor. In some implementations, the method comprises receiving at the collision detection device Wi-Fi signals reflected from the moving object where the Wi-Fi signals originate from a Wi-Fi source not associated with the moving object. The method further comprises detecting, measuring, and tracking the Doppler effect of the Wi-Fi signals at the collision detection device to track velocity vector relative to the collision detection device. The method further comprises calculating the time of arrival of the moving object based on the velocity vector relative to the location of the collision detection device. The method further comprises tracking the relative angle between the moving object and the collision detection device based on the velocity vector. The method further comprises predicting the occurrence of a collision between the moving object and the collision detection device based on the relative angle. The method further comprises providing a notification based on the predicting step.

Figure 3:
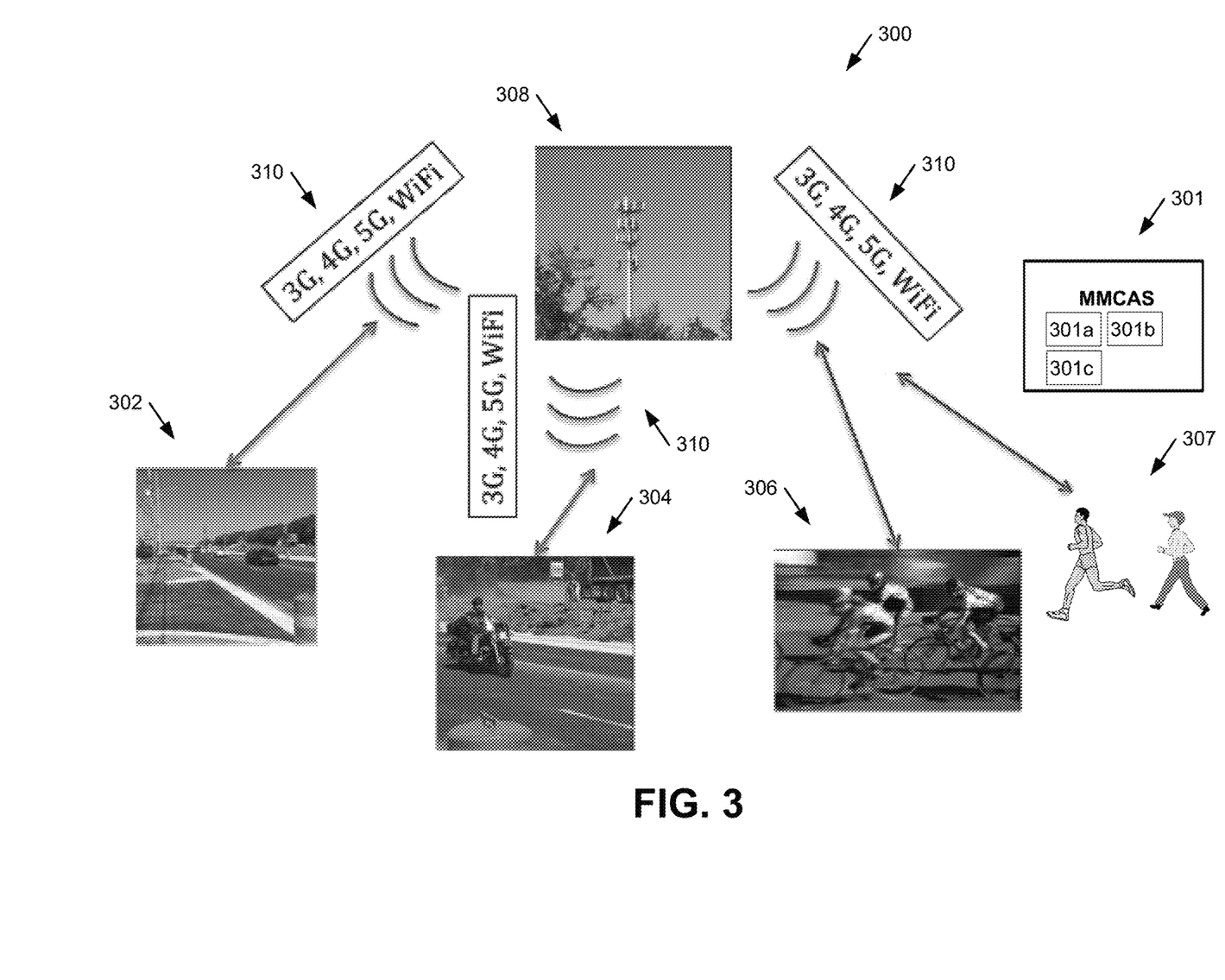
FIG. 3 illustrates an example wireless network environment in which a MMCAS according to the present disclosure can operate to alert an associated user of an approaching vehicle or potential collision.

FIG. 3 illustrates an example wireless network environment 300 in which a MMCAS according to the present disclosure can operate to alert an associated user of an approaching vehicle or potential collision.

In some implementations, the environment includes any combination of one or more pedestrians 307, one or more motorcycles 304, one or more bicycles 306, and/or one or more of any other motor vehicles (e.g., such as automobiles, aircrafts, buses, tractor trailers, rental trucks, golf carts, trains, forklifts, self driving vehicles, electric automobiles etc.).

In some implementations, one or more of the pedestrians 307, motorcycles 304, bicycles 306, and/or other motor vehicles 302 may be equipped with a MMCAS 301 operative to alert an associated user of an approaching vehicle or potential collision.

For example, a pedestrian 307 may be equipped with a MMCAS to alert the pedestrian of an approaching vehicle (e.g., 304, 302), bicycle (e.g., 304), or other pedestrian or potential collision. As another example, a bicyclist on a bicycle (e.g., 306) may be equipped with a MMCAS to alert the bicyclist of an approaching vehicle (e.g., 304, 302), another bicycle, or pedestrian 307 or potential collision. In some implementations, the bicycle may be equipped with the MMCAS. As yet another example, a vehicle (e.g., 304) may be equipped with a MMCAS to alert a associated driver of another approaching vehicle, bicycle (e.g., 304), or other pedestrian or potential collision.

In some implementations, a MMCAS may be a stand-alone device. In some implementations, the MMCAS may be embedded or integrated within a wearable consumer product, cell phone, motorcycle, bicycle, or other motor vehicle. In some implementations, the MMCAS may be embedded or integrated in a wearable product, such as an article of clothing, an accessory, or other wearable item that incorporates computer or advanced electronic technology to provide practical functions or features. In some implementations, the MMCAS may be embedded or integrated in an armband or bracelet to be worn by a MMCAS user.

In some implementations, the environment 300 may further comprise transmitters of opportunity 308 to emit signals (e.g., wireless signals 310) to be received and processed by a MMCAS, as discussed in greater detail below, to alert an associated user of an approaching vehicle or potential collision.

In some implementations, a transmitter of opportunity may be any emitter in the environment. In some implementations, a transmitter of opportunity may be a Wi-Fi emitter or mobile/cell phone emitter. In some implementations, a transmitter of opportunity may be a Wi-Fi network access point, a wireless base stations, or other devices employing IEEE 802.11xx or other communications standards.

In some implementations, one or more transmitters 308 may produce wireless signals 310 in the environment 300 that a MMCAS can process to determine distances, velocities, or other suitable parameters regarding one or more pedestrians 307, motorcycles 304, bicycles 306, and/or other motor vehicles 302. These parameters may be used to alert an associated user of an approaching vehicle or potential collision.

For example, in some implementations, one or more transmitters of opportunity 308 may comprise Wi-Fi transmitters in the environment 300. In some implementations, one or more transmitters 308 may comprise mobile/cell phone emitters. In some implementations, one or more transmitters 308 may be any other transmitter that emits radiation or signals. In some implementations, the radiation or signals may be intermittent or pulsed. In some implementations, the radiation or signals may be signal packets, beacon signals, control signals, or other suitable signal. In some implementations, the emitters may be IEEE 802.11, IEEE 802.16, or IEEE 802.21 compliant or compliant with any other IEEE 802.xx standard.

In some implementations, one or more of the motorcycles 304, bicycles 306, other motor vehicles 302, or MMCAS 301 may comprise one or more emitters to transmit Wi-Fi signals or other suitable signals to be received and processed by a MMCAS to alert an associated user of an approaching vehicle or potential collision.

In some implementations, one or more of the motorcycles 304, bicycles 306, other motor vehicles 302, or MMCAS 301 may comprise radio frequency identification (RFID) technology to emit signals to be received and processed by a MMCAS to alert an associated user of an approaching vehicle or potential collision.

In some implementations, a MMCAS is configured to provide an alert to an associated user through one or more optical, audio, or other sensory mediums.

In some implementations, a MMCAS is configured to provide a warning distance that is sufficient to allow a user to take evasive action (e.g., change course, pull off the road, or other action) to avoid a potential collision.

Figure 1:
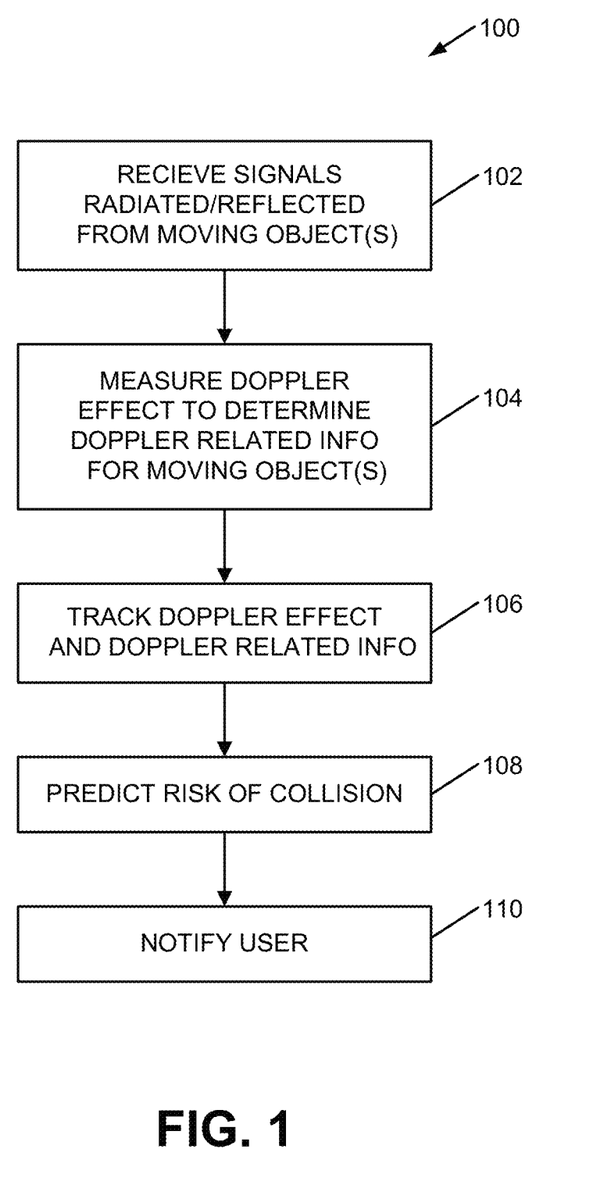
FIG. 1 illustrates an example method using a MMCAS to detect an approaching vehicle or potential collision and alert an associated user according to an implementation of the present disclosure.

FIG. 1 illustrates an example method 100 using a MMCAS (e.g., 301) to detect an approaching vehicle (e.g., 302, 304) or potential collision (e.g., 302, 304, 306, 307) and alert an associated user according to an implementation of the present disclosure.

Any moving object which radiates (e.g. broadcast a signal) or reflects radiation will exhibit the Doppler effect. The Doppler effect may occur for both continuous and intermittent or pulsed radiation. Wi-Fi, mobile phone, and RFID sources emit radiation or signals that are generally intermittent or pulsed. For example, signal packets, beacon signals, and control signals are generally intermittent or pulsed. These signals will exhibit the Doppler effect when the receiving device is moving, the radiation or signal source is moving, or both are moving.

Accordingly, to detect an approaching vehicle or potential collision, the MMCAS (e.g., MMCAS 301) at step 102 receives radiated or reflected signals from moving sources.

In some implementations, the MMCAS may comprise a passive, receiver 301*a* to receive signals from transmitters of opportunity (such as mobile/cell phone or Wi-Fi devices). In some implementations, the receiver 301*a* may not depend on overt cooperation with transmitters of opportunity. In some implementations, the receiver 301*a* may be a coherent receiver. In some implementations, the receiver 301*a* may be an incoherent receiver.

By using available standard compliant (e.g. IEEE Standard 802.11) emitters of opportunity, a MMCAS may be manufactured for a relatively low cost and may have very low power consumption. In some implementations, a MMCAS may comprise integrated circuits to perform the processing functions. In some implementations, a MMCAS may comprise software and a microprocessor 301*c* to perform the processing functions.

In some implementations, the large number of transmitters of opportunity means that approaching vehicle (e.g., 302, 304) or potential collision (e.g., 302, 304, 306, 307) may be surrounded by electro-magnetic radiation. The various paths of the radiation include a direct path from a transmitter of opportunity to the MMCAS, and an indirect path from the transmitter of opportunity to moving object that is then reflected to the MMCAS. The relative Doppler Shift in frequency of these electromagnetic signals provides a measure of the relative approaching and receding speeds of the moving object.

In some implementations, an approaching vehicle or potential collision may radiate Wi-Fi signals that may be used.

At step 104, the MMCAS detects and measures the Doppler effect from the signals received at step 102 or from signals derived from the signals received at step 102 ("received signals") to determine doppler related information for the moving source(s).

In some implementations, the MMCAS is configured to use one or more signal processing techniques to measure the Doppler effect.

In some implementations, the MMCAS is configured to use one or more time and/or frequency domain techniques to measure the Doppler effect.

In some implementations, the signal processing technique comprises auto-correlation and/or cross-correlation of the time-based signals to determine range and velocity of the moving source of the signal generation.

In some implementations, the MMCAS is configured to employ time domain techniques used in bi-static radars (e.g., auto-correlation and cross-correlation of received signals) to estimate the range, bearing angle, and Doppler frequency of the received signals.

In some implementations, the signal processing technique comprises incoherent and coherent signal reception combined with appropriate signal filtering.

In some implementations, the signal processing technique comprises frequent measurement of the range to the signal source along with an accurate measurement of the time between range measurements.

In some implementations, the MMCAS is configured to employ frequency domain techniques to measure the relative phase change in the received signals.

In some implementations, the MMCAS is configured to measure the Doppler effect at the communication carrier, subcarrier, or data packet level.

In some implementations, the MMCAS is configured to use one or more of the above-mentioned signal processing techniques to measure the Doppler effect.

In some implementations, the MMCAS is configured to measure the Doppler Effect to determine information needed to characterize the velocity vector of the distance separating a moving source from the MMCAS.

At step 106, the MMCAS tracks the Doppler related information. In some implementations, the MMCAS is configured to use electronic circuits and techniques to detect and decode Wi-Fi access points beacon signals and/or mobile phone control signals. In this way, in some implementations, the MMCAS is configured to maintain correlation between each moving source and its measured Doppler frequency/velocity vector.

In some implementations, the MMCAS is configured to cease tracking a moving source once the measurement of the Doppler frequency changes from positive to negative as a negative frequency indicates that the moving source is moving away from the MMCAS.

At step 108, the MMCAS may predict the occurrence of a collision between a moving source and the MMAC. In some implementations, the MMCAS may estimate the time of arrival of a moving source based on the velocity vector relative to the location of the MMCAS. In some implementations, the MMCAS may measure the relative angle between the moving source and the MMCAS based on the velocity vector.

In some implementations, the MMCAS is configured to track the relative angle in accordance with proportional navigation techniques.

In some implementations, the MMCAS may predict the occurrence of a collision between the moving source and the MMCAS based on the relative angle.

In some implementations, the MMCAS will predict that a collision will occur for a measurement of a constant relative angle. In some implementations, the MMCAS will predict that a collision will not occur for a measurement of a non-constant relative angle.

At step 110, the MMCAS is configured to provide situational awareness and/or a warning to a user of the MMCAS about approaching objects.

In some implementations, the MMCAS is configured to provide an alert if the MMCAS detects the presence of an approaching object (e.g., 302, 304, 306, 307).

In some implementations, the MMCAS is configured to provide an alert if the MMCAS predicts that a collision will occur.

In some implementations, the MMCAS is configured to notify the user of the range, velocity, and/or direction of the approaching object.

In some implementations, the MMCAS is configured to provide an alert through one or more auditory, visual, or haptic interfaces.

In some implementations, the MMCAS may provide a warning to the user at a sufficient distance to allow the wearer to take evasive action (e.g. change course, pull off the road etc.) to avoid the potential collision. In some implementations, the MMCAS may provide a warning to a user when a moving source is within 100 meters and 300 meters (inclusive of the endpoints) of the MMCAS. In some implementations, the MMCAS may provide a warning to a user when a moving source is less than 100 meters of the MMCAS. In some implementations, the MMCAS may provide a warning to a user when a moving source is greater than 300 meters of the MMCAS. In some implementations, the warning distance is any other suitable distance.

Figure 4:
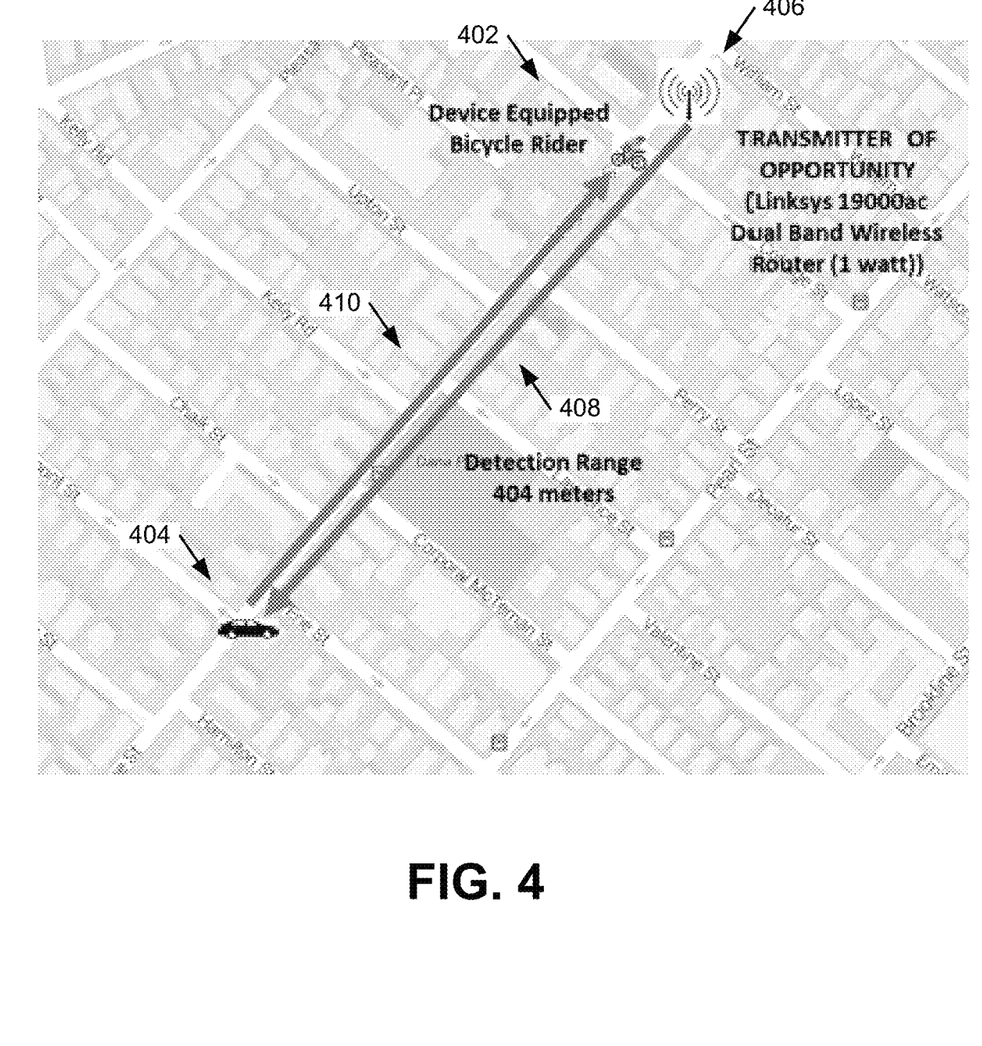
FIG. 4 illustrates an implementation of an example operation of the MMCAS according to the present disclosure.

FIG. 4 illustrates an implementation of an example operation of the MMCAS according to the present disclosure.

In some implementations, the operation of the MMCAS is a variant of a passive bi-static radar.

In some implementations, the operation scenario comprises a user 402 of the MMCAS, a vehicle 404 approaching the MMCAS user 402, and a transmitter 406 of opportunity.

In some implementations, the MMCAS user 402 is a bicyclist.

In some implementations, the transmitter 406 of opportunity is a wireless modem that is broadcasting an IEEE 802.11 compliant signal.

In some implementations, the transmitter 406 of opportunity emits transmitted Wi-Fi signals 408 in the vicinity of the user 402 and vehicle 404.

In some implementations, the transmitted Wi-Fi signals 408 are reflected off the vehicle 404.

In some implementations, the reflected Wi-Fi signals 410 are detected by the MMCAS and processed to detect the vehicle 404 approaching the user 402 (as described above).

In some implementations, the Doppler effect of the Wi-Fi signals 410 is measured and processed by the MMCAS to detect the vehicle 404 (as also described above).

Figure 2A:
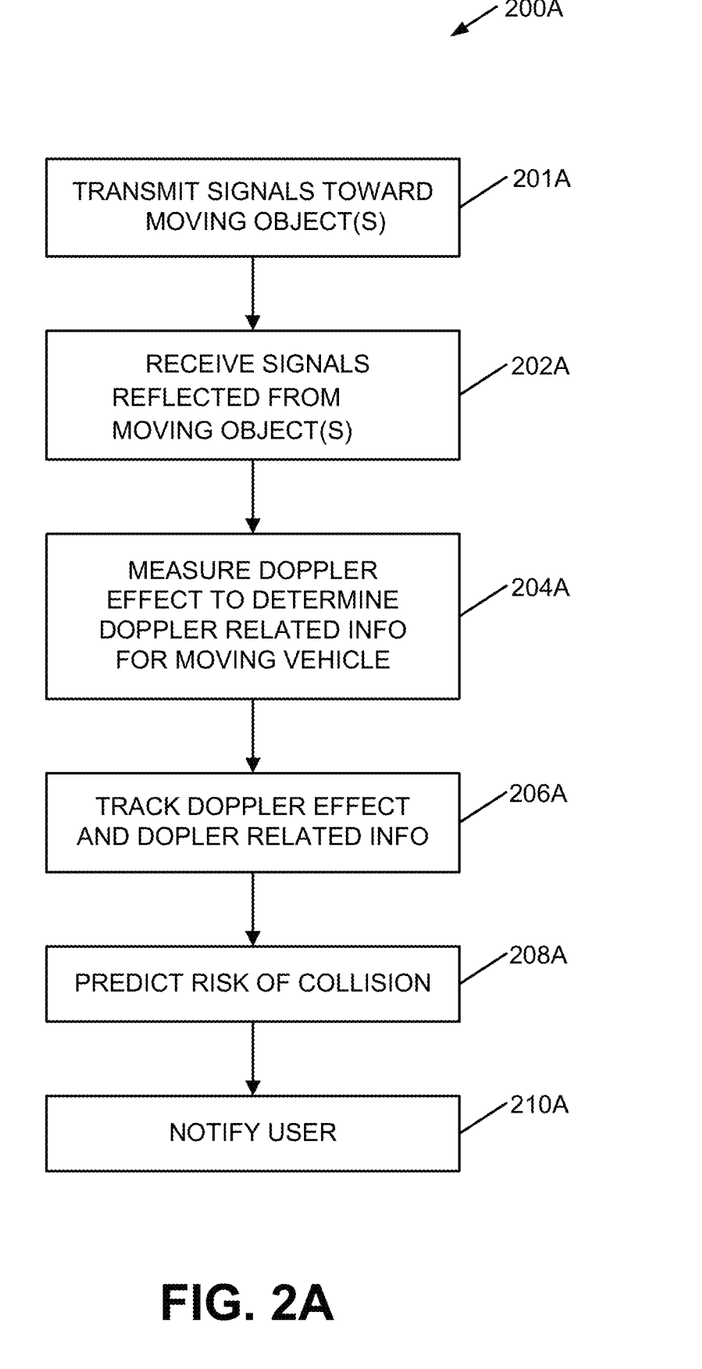
FIG. 2A illustrates another example method using a MMCAS to detect an approaching vehicle or potential collision and alert an associated user according to an implementation of the present disclosure.

FIG. 2A illustrates another example method 200A using a MMCAS (e.g., 301) to detect an approaching vehicle (e.g., 302, 304) or potential collision (e.g., 302, 304, 306, 307) and alert an associated user according to an implementation of the present disclosure.

In a conventional active monostatic radar, both a transmitter subsystem and a receiver subsystem are collocated at the radar site. Generally, the transmitter sends a signal, which is reflected off of the target and received back at the radar site. The time delay between when the signal is transmitted and received back provides an estimate of the range to the target (when the time delay is divided by the speed of light). The Doppler shift, or frequency shift, of the received signal compared to the transmitted signal provides an indication of the relative velocity of the target.

In some implementations, the MMCAS may comprise an integrated transmit function 301b (e.g., active, optical, sonic, etc. sensor) to transmit signals (e.g., electromagnetic waveforms) and directly measure the distance, speed, and/or any other suitable parameter of a moving source.

Accordingly, at step 201A, the MMCAS transmits signals toward moving sources.

In some implementations, transmit function 301b comprises a four element, conformal Micros trip patch array. In some implementations, the transmit function 301b comprises a transmit power of 0.01 watts per element. In some implementations, the transmit function 301b is implemented in Silicon on Insulator (SOI) technology. In some implementations, the transmit function 301b is configured to transmit a one microsecond Frequency-Modulated Continuous Wave (FMCW) pulse. In some implementations the transmit function 301b is implemented on a single SOI chip less than 8 mm on a side.

At step 202A, the MMCAS receives reflected signals from moving sources.

At step 204A, the MMCAS detects and measures the Doppler effect from the signals received at step 202A or from signals derived from the signals received at step 202A ("received signals") to determine doppler related information for the moving source(s).

Similarly, to step 104, the MMCAS is configured to use one or more appropriate signal processing techniques to measure the Doppler effect, as discussed above.

At step 206A, the MMCAS tracks the Doppler related information. Similar to step 106, in some implementations, the MMCAS is configured to cease tracking a moving source once the measurement of the Doppler frequency changes from positive to negative as a negative frequency indicates that the moving source is moving away from the MMCAS.

At step 208A, the MMCAS may predict the occurrence of a collision between a moving source and the MMCAS. In some implementations, the MMCAS may estimate the time of arrival of a moving source based on the velocity vector relative to the location of the MMCAS. In some implementations, the MMCAS may measure the relative angle between the moving source and the MMCAS based on the velocity vector.

In some implementations, the MMCAS may predict the occurrence of a collision between the moving source and the MMCAS based on the relative angle.

In some implementations, the MMCAS will predict that a collision will occur for a measurement of a constant relative angle. In some implementations, the MMCAS will predict that a collision will not occur for a measurement of a non-constant relative angle.

At step 210A, the MMCAS is configured to provide situational awareness and/or a warning to a user of the MMCAS about approaching objects similar to step 110.

Figure 2B:
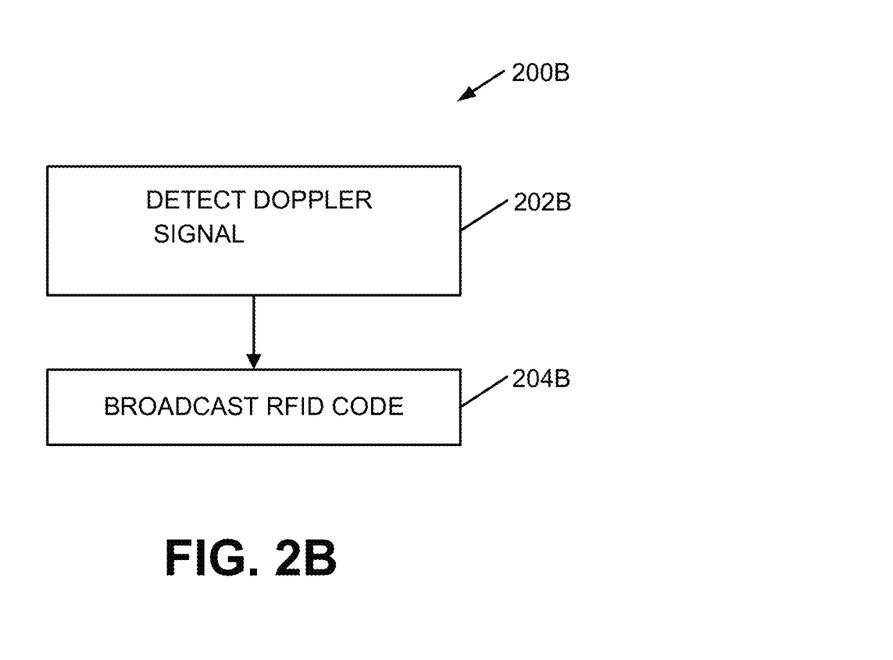
FIG. 2B illustrates an example method using a MMCAS to detect an approaching vehicle or potential collision and alert the moving object according to an implementation of the present disclosure.

FIG. 2B illustrates an example method 200B using a MMCAS (e.g., 301) to detect an approaching vehicle (e.g., 302, 304) or potential collision (e.g., 302, 304, 306, 307) and alert the moving object (e.g., 302, 304, 306, 307) according to an implementation of the present disclosure.

At step 202B, when the MMCAS detects and the Doppler effect from the received signals, at step 204B, the MMCAS broadcasts a code (e.g., a RFID code). In some implementations, the RFID code comprises a unique code to classify the user of the MMCAS as, for example, a pedestrian, jogger, bicyclist, etc. In some implementations, a moving object may be configured to receive and process the RFID code to alert the user of the moving object of the presence and classification of the user of the MMCAS. For example, in some implementations, the RFID code broadcasted by the MMCAS may be shared with vehicle manufactures to equip vehicles to recognize the RFID code and provide an alert.

Figure 2C:
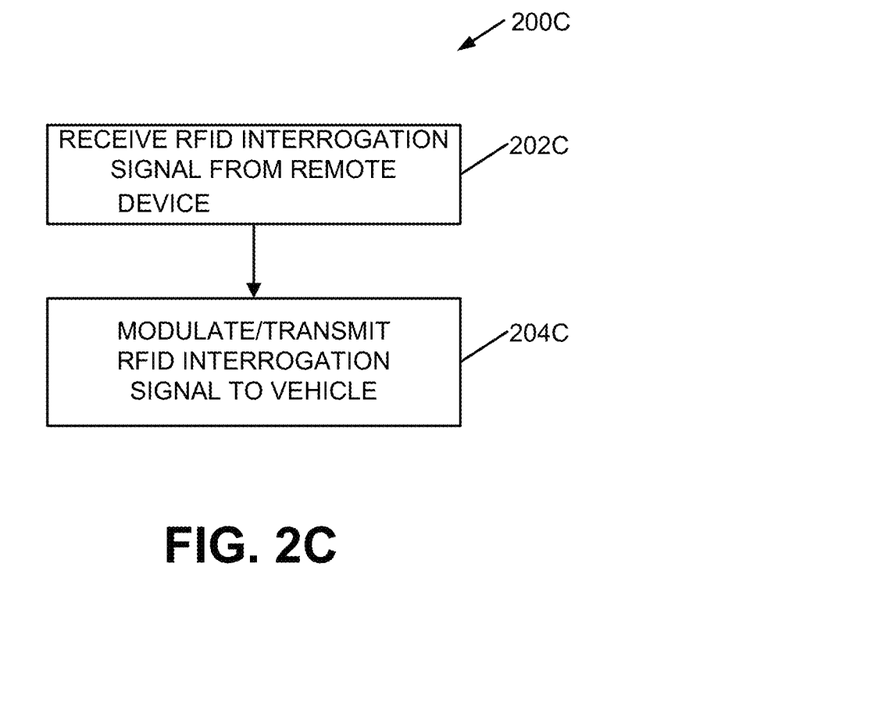
FIG. 2C illustrates another example method using a MMCAS to detect an approaching vehicle or potential collision and alert the moving object according to an implementation of the present disclosure.

FIG. 2C illustrates another example method 200C using a MMCAS (e.g., 301) to detect an approaching vehicle (e.g., 302, 304) or potential collision (e.g., 302, 304, 306, 307) and alert the moving object (e.g., 302, 304, 306, 307) according to an implementation of the present disclosure.

In some implementations, a moving object may be configured to transmit and receive an RFID signal. In some implementations, a moving object may transmit a RFID interrogation signal. At step 202C, a MMCAS may receive the RFID interrogation signal from the moving object. At step 204C, the MMCAS may modulate the RFID interrogation signal and transmit the modulated RFID signal for reception by the moving object to alert the user of the moving object of the presence and classification of the user of the MMCAS.

In some implementations, the RFID code and RFID interrogation signal meet the requirements of applicable RFID standards.

In some implementations, a MMCAS is configured to detect a collision between an MMCAS user and a vehicle equipped with an MMCAS remote device.

In some implementations, the MMCAS is configured to record details related to the collision. In some implementations, the details comprise identifying information about the vehicle.

In some implementations, the MMCAS is configured to transmit an alert and the details related to the collision to a remote recipient. In some implementations, the remote recipient is a monitoring service, a law enforcement agency, an ambulance service, or other emergency contact.

In some implementations, the MMCAS is configured to allow the MMCAS user to activate an emergency request to deploy an ambulance, law enforcement, or other emergency service. In some implementations, the MMCAS is configured to provide global positioning system (GPS) location information when the user activates the emergency request.

In some implementations, the MMCAS is configured to automatically transmit the emergency request after a collision is detected.

In some implementations, the MMCAS remote device is configured to record the details related to the collision to electronically mark the vehicle (e.g., in case of a hit and run occurrence).

In some implementations, the MMCAS remote device is configured to transmit GPS location information to locate or track the vehicle after the collision with the MMCAS user.

In some implementations, the MMCAS is configured to distinguish between multiple approaching vehicles in a group in which the vehicles are each equipped with an MMCAS remote device.

In some implementations, the MMCAS can comprise commercial off the shelf (COTS) integrated circuits to perform modem and processing functions.

For example, in some implementations, functions of the MMCAS can be performed by a software modified commercial chipset supplemented by an external microprocessor.

In some implementations, the MMCAS is configured to be composed of silicon on insulator semiconductor (SOI) technology.

In some implementations, the MMCAS is configured to be composed of any other suitable materials.

In some implementations, the MMCAS is configured to be composed on an SOI chip configured to comprise a radar and a microprocessor.

In some implementations, the MMCAS is configured to be composed on any other suitable chip having any suitable dimensions.

In some implementations, the MMCAS is configured to integrate any combination of the functionality described in FIGS. 1, 2A, 2B, and 2C.

In some implementations, the MMCAS is configured to use the functionality described in FIGS. 1, 2A, 2B, and 2C to detect, track, classify, or provide a positive identification of a motor vehicle, a cyclist, or pedestrian to one or more users (such as the motor vehicle driver, the cyclist, or the pedestrian).

In some implementations, the MMCAS is configured to use the functionality described in FIGS. 1, 2A, 2B, and 2C in conditions of diminished optical visibility such as rain, fog, smoke, or dust.

In some implementations, the MMCAS is configured to provide the user with the option of automatically or manually engaging the functionality described in FIGS. 2A and 2B.

The figures, including photographs and drawings, comprised herewith may represent one or more implementations of the multi-mode collision avoidance system.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present disclosure. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the disclosure. One skilled in the relevant art will recognize, however, that embodiments of the disclosure can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A method using a collision detection device associated with a user to detect a moving object in an environment and provide an alert to the user wherein the environment comprises at least one transmitter of opportunity and the collision detection device comprises a receiver and a processor, the method comprising:
   receiving at the collision detection device wireless signals directly from pH the at least one transmitter of opportunity and the wireless signals reflected from the moving object where the wireless signals originate from the at least one transmitter of opportunity, wherein the at least one transmitter of opportunity is a cellular phone emitter and the at least one transmitter of opportunity is not co-located with the moving object and not co-located with the collision detection device such that the at least one transmitter of opportunity does not move with the moving object and does not move with the collision detection device and wherein the at least one transmitter of opportunity is not selected by either the moving object or the collision detection device;
   detecting, measuring, and tracking a Doppler effect of the wireless signals at the collision detection device to track a velocity vector relative to the collision detection device where the Doppler effect is not based on location information of the at least one transmitter of opportunity and not based on a separate signal generated by the moving object;
   calculating a time of arrival of the moving object based on the velocity vector relative to a location of the collision detection device where the calculation is not based on location information of the at least one transmitter of opportunity and not based on a separate signal generated by the moving object;
   tracking a relative angle between the moving object and the collision detection device based on the velocity vector where the tracking is not based on location information of the at least one transmitter of opportunity and not based on a separate signal generated by the moving object;
   predicting the occurrence of a collision between the moving object and the collision detection device based on the relative angle where the prediction is not based on location information of the at least one transmitter of opportunity and not based on a separate signal generated by the moving object; and
   providing a notification based on the predicting step.

2. The method of claim 1 wherein the moving object is a vehicle and the collision detection device is affixed to a person.

3. The method of claim 1 further comprising:
   upon user selection, transmitting signals from the collision detection device toward the moving object;
   receiving at the collision detection device the transmitted signals reflected from the moving object;
   detecting, measuring, and tracking the Doppler effect of the reflected signals of the transmitted signals from the collision detection device at the collision detection device to track a second velocity vector relative to the collision detection device;
   calculating the time of arrival of the moving object based on the velocity vector relative to the location of the collision detection device;
   tracking the relative angle between the moving object and the collision detection device based on the velocity vector;
   predicting the occurrence of a collision between the moving object and the collision detection device based on the relative angle; and
   providing a notification based on the predicting step.

4. The method of claim 3 further comprising broadcasting a code to the moving object based on the Doppler effect of the reflected signals of the transmitted signals from the collision detection device.

5. The method of claim 4 further comprises receiving a RFID interrogation signal from a second moving object, modulating the RFID interrogation signal, and transmitting the modulated RFID signal for reception by the second moving object.

6. The method of claim 1 wherein the wireless signals are signal packets.

7. The method of claim 1 wherein the wireless signals are control signals.

8. The method of claim 1 wherein the at least one transmitter of opportunity is an emitter that is IEEE 802.11, IEEE 802.16, or IEEE 802.21 compliant.

9. A method using a collision detection device associated with a user to detect a moving object in an environment and provide an alert to the user wherein the environment comprises at least one transmitter of opportunity and the collision detection device comprises a receiver and a processor, the method comprising
   receiving at the collision detection device wireless signals directly from the at least one transmitter of opportunity and the wireless signals reflected from the moving object where the wireless signals originate from the at least one transmitter of opportunity, wherein the at least one transmitter of opportunity is not co-located with the moving object and not co-located with the collision detection device such that the at least one transmitter of opportunity does not move with the moving object and does not move with the collision detection device and wherein the at least one transmitter of opportunity is not selected by either the moving object or the collision detection device, wherein the at least one transmitter of opportunity is an emitter that is IEEE 802.11, IEEE 802.16, or IEEE 802.21 compliant or compliant with any other IEEE 802 or IEEE 802.11 standard amendment; detecting, measuring, and tracking a Doppler effect of the wireless signals at the collision detection device to track a velocity vector relative to the collision detection device where the Doppler effect is not based on location information of the at least one transmitter of opportunity and not based on a separate signal generated by the moving object; calculating a time of arrival of the moving object based on the velocity vector relative to a location of the collision detection device where the calculation is not based on location information of the at least one transmitter of opportunity and not based on a separate signal generated by the moving object; tracking the relative angle between the moving object and the collision detection device based on the velocity vector where the calculation is not based on location information of the at least one transmitter of opportunity and not based on a separate signal generated by the moving object; predicting the occurrence of a collision between the moving object and the collision detection device based on the relative angle where the prediction is not based on location information of the at least one transmitter of opportunity and not based on a separate signal generated by the moving object;

upon user selection, transmitting signals from the collision detection device toward the moving object; receiving at the collision detection device the transmitted signals reflected from the moving object; detecting, measuring, and tracking the Doppler effect of the reflected signals of the transmitted signals from the collision detection device at the collision detection device to track a second velocity vector relative to the collision detection device; calculating a time of arrival of the moving object based on a velocity vector relative to the location of the collision detection device; tracking a relative angle between the moving object and the collision detection device based on the velocity vector; and predicting the occurrence of a collision between the moving object and the collision detection device based on the relative angle;

providing a notification based on the predicting steps;

broadcasting a code to the moving object based on the Doppler effect of the reflected signals of the transmitted signals from the collision detection device; and when receiving a RFID interrogation signal from a second moving object, modulating the RFID interrogation signal, and transmitting the modulated RFID signal for reception by the moving object.

* * * * *